Feb. 23, 1932.   C. I. PACKER   1,846,898
WORKHOLDING CHUCK
Filed March 11, 1930   2 Sheets-Sheet 1
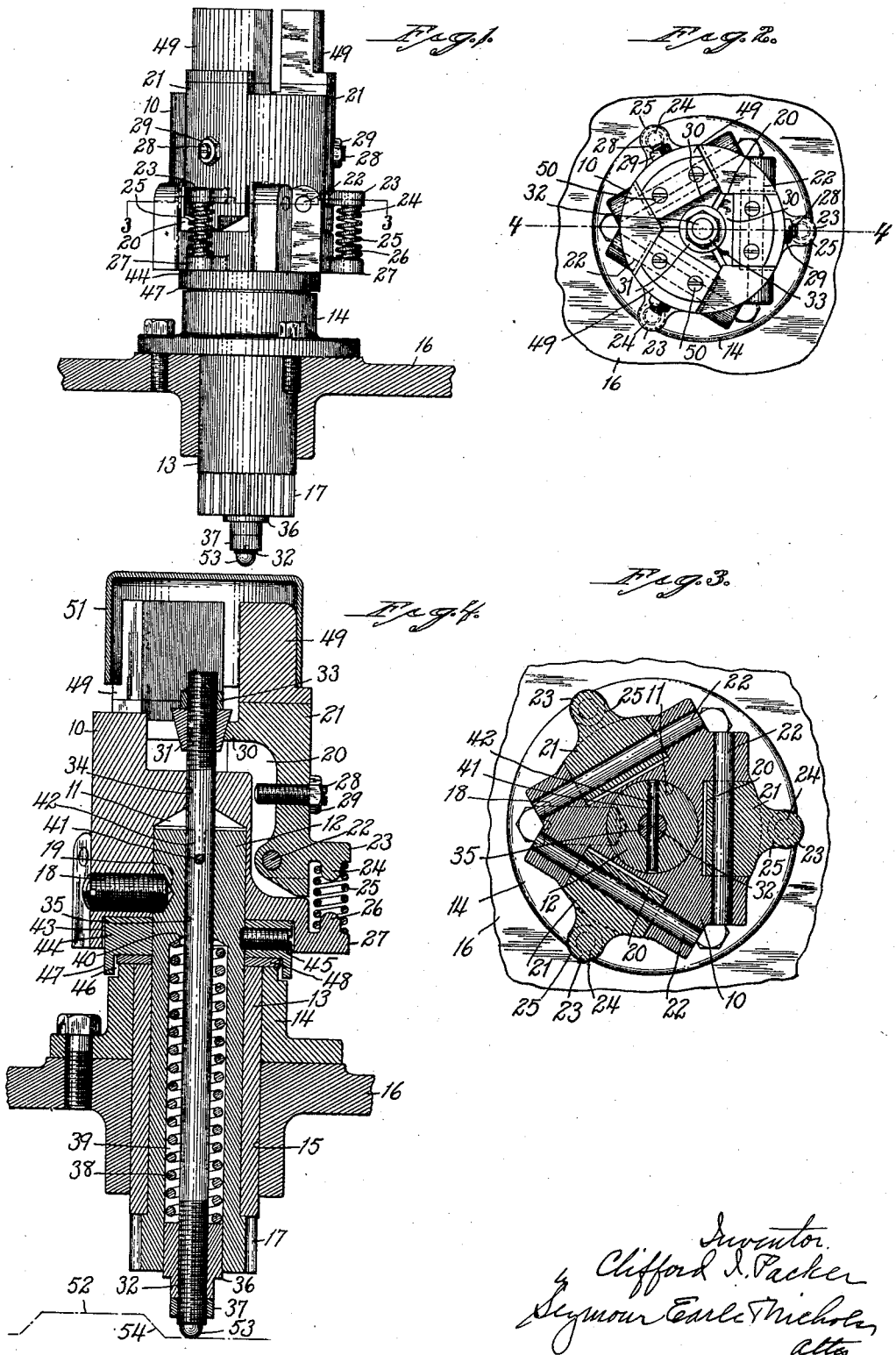

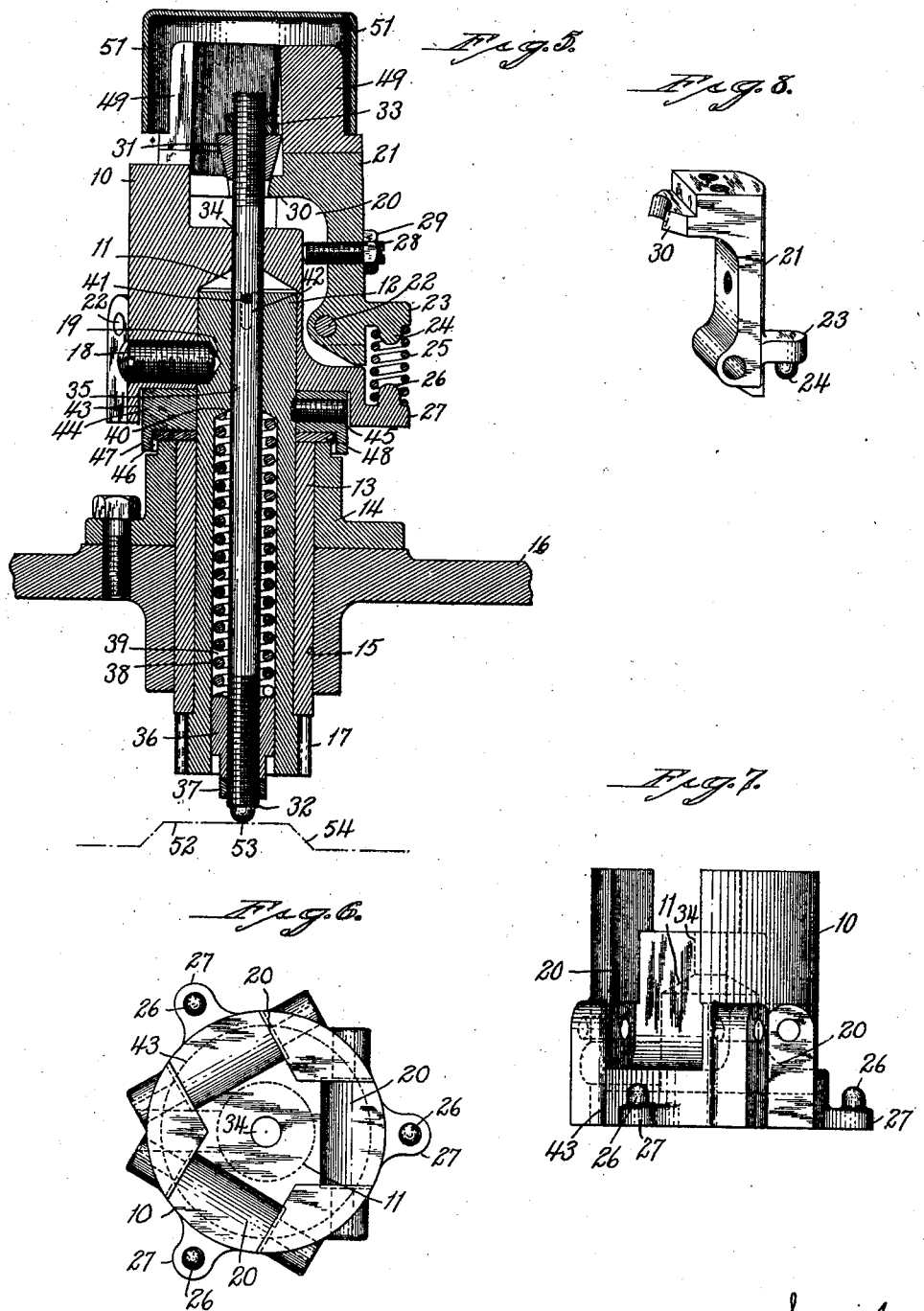

Patented Feb. 23, 1932

1,846,898

UNITED STATES PATENT OFFICE

CLIFFORD I. PACKER, OF MERIDEN, CONNECTICUT, ASSIGNOR TO THE C. I. PACKER TOOL & DIE COMPANY, OF MERIDEN, CONNECTICUT, A CORPORATION

WORKHOLDING CHUCK

Application filed March 11, 1930. Serial No. 434,902.

This invention relates to an improvement in work-holding chucks and particularly to work-holding chucks of the type designed for use upon automatic grinding, buffing and polishing machines, though not so limited.

The main object of this invention is to provide a simple, compact and convenient chuck of the type referred to, characterized by its superior resistance to wear and derangement. With the above and other objects in view, as will appear from the following, my invention consists in a work-holding chuck having certain details of construction and combinations of parts as will be hereinafter described and particularly recited in the claims.

In the accompanying drawings:

Fig. 1 is a view in side elevation of a work-holding chuck embodying my invention and shown as mounted upon the table of an automatic machine which is broken away and shown in section;

Fig. 2 is a top or plan view thereof;

Fig. 3 is a transverse sectional view taken on the line 3—3 of Fig. 1 but on a larger scale;

Fig. 4 is a vertical, central, sectional view of my improved chuck taken on the line 4—4 of Fig. 2 and showing the parts in the positions due to them when the jaws are expanded to grip the work;

Fig. 5 is a corresponding view, but showing the parts in the positions due to them when the jaw-control plunger has been moved to permit the jaws to retire and free the work for removal;

Fig. 6 is a detached top or plan view of the jaw-carrying head;

Fig. 7 is a view thereof in side elevation; and

Fig. 8 is a detached perspective view of one of the pivotal jaws.

In the particular embodiment of my invention herein chosen for illustration, I employ a jaw-carrying head 10 formed in its inner face with a cylindrical axial socket 11 receiving the upper end of a chambered driving-spindle 12 rotating within a bushing 13 of bronze or other suitable antifriction metal, mounted in a sleeve-like mounting-plate 14 and passing downward through a centralizing passage 15 in a work-table 16, or other suitable fixture of a machine in which it is desired to install my improved chuck.

The lower end of the driving-spindle 12 which projects beyond the adjacent end of the bushing 13 is enlarged and cut to form an integral driving-pinion 17 for engagement by any suitable mechanism designed to impart a rotary movement to the chuck. The upper end of the driving-spindle 12 is coupled to the head 10 by providing the latter with a radial set-screw 18 projecting into a shallow socket 19 in the periphery of the upper end of the said spindle.

The jaw-carrying head 10, above referred to, is of substantially cylindrical form and is formed at equidistant points in its periphery with three (more or less) vertically-arranged jaw-receiving recesses 20 which intersect its upper face, as clearly shown in Figs. 6 and 7.

Installed in each of the jaw-receiving recesses 20 above referred to, is a pivotal jaw 21 mounted upon a pin 22 extending across each of the said recesses and supported in the opposite walls thereof. Each jaw is formed with an outwardly-offsetting lug 23 having a downwardly-facing pilot-boss 24 fitting within the upper end of a helical jaw-retracting spring 25, the lower end of which receives a pilot-boss 26 upstanding from a lug 27 radially-offsetting from the chuck-carrying head 10 centrally beneath each of the respective jaws 21.

To limit the inward swinging movement of the jaws 21, each of the same is provided with a radial stop-screw 28, carrying a lock-nut 29 at its outer end and adapted to engage the inner wall of the particular recess 20 in which it happens to be installed, as clearly shown in Fig. 5 of the drawings.

For the purpose of swinging the jaws 21 outward as required to grip the work, each of the same is provided with an inwardly-projecting nose 30, the inner face of which is conically contoured and bears against the periphery of a conical jaw-expanding cam 31 threaded upon the upper end of a jaw-control plunger 32 and locked in various positions of adjustment thereupon by means of a jam-nut 33. The said jaw-control plunger 32 projects downward through an axial passage 34 in the head 10 and into a corresponding passage 35 in the driving-spindle 12 and carries at its lower end an adjustable spring-seat 36 threaded upon the lower end of the said plunger and adapted to be locked in place thereon in any one of a variety of positions of adjustment by means of a jam-nut 37.

Engaging the upper face of the spring-seat 36 is the lower end of a helical jaw-expanding spring 38 encircling the plunger 32 and housed within a longitudinal chamber 39 formed in the driving-spindle 12 and intersected at its upper end by the passage 35 in which the said plunger reciprocates. The upper end of the spring 38 impinges against a shoulder 40 formed in the driving-spindle 12 at the junction of the passage 35 and chamber 39 aforesaid.

The spring 38 exerts a constant effort to depress the plunger 32, for the purpose as will hereinafter appear, and the resulting downward movement of the plunger is limited by providing it with a diametrically-arranged stop-pin 41 riding in a diametric groove 42 in the upper end of the driving-spindle 12. The said pin, in addition to limiting the downward movement of the plunger 32 with respect to the spindle 12, also serves to couple the said parts together for concurrent rotation.

The under face of the head 10 is formed with an annular recess 43 for the reception of a dust-guard 44 secured to the driving-spindle 12 by means of a set-screw 45 and provided in turn in its under face with an annular recess 46, resulting in the formation of an annular guard-flange 47. Located within the recess 46, in the dust-guard 44 and interposed between the under face thereof and the upper face of the adjacent ends of the bushing 13 and the mounting-plate 14, is a hardened thrust-washer 48 through which the driving-spindle 12 extends, as clearly shown in Figs. 4 and 5 of the drawings.

For the purpose of adapting the jaws 21 to grip various articles which are to be operated upon, I provide each of the said jaws with interchangeable jaw-extensions 49 attached thereto by screws 50 and having their outer faces shaped to conform to the particular piece of work being handled, such for instance as a cup-shaped clock-case 51, shown in Figs. 4 and 5.

In the use of my improved chuck, it is preferably mounted in an automatic machine, such for instance as that shown in my copending application, filed January 16, 1930, Serial No. 421,148; and is adapted to be rotated as it is bodily moved by means of the work-table 16, in connection with which a cam is employed, as indicated by the broken lines 52 in Figs. 4 and 5.

Normally, the jaw-expanding spring 38 will act to maintain the plunger 32 in its fully-depressed position, in which the conical cam 31 will hold the jaws 21 and the supplementary jaws 49 in their expanded positions, in which they grip the work 51, as shown in Fig. 4 of the drawings.

When, in the bodily movement of the chuck, the spherically-contoured terminal 53 of the plunger 32 rides up the rise 54 of the cam 52, the tension of the spring 38 will be overcome and the said plunger lifted to permit the jaw-retracting spring 25 of each of the jaws to swing the latter inward, together with their supplementary jaws 49, into the positions shown in Fig. 5, thereby releasing the work for removal and permitting the application of another piece to be operated upon, it being understood that all of the chuck parts, with the exception of the mounting-plate 14 and the bushing 13, are adapted to be rapidly rotated by any suitable means engaging the pinion 17 at the lower end of the driving-spindle 12.

Should it be desired to alter the throw of the jaws 21, it will be seen from the drawings that this may be readily accomplished by loosening the jam-nut 33 and threading the conical cam 31 in or out upon the plunger 32, as required. When handling relatively thin and flexible metal parts, it is highly important that the outward tension upon the jaws 21 be carefully regulated, and this may be accomplished by suitably adjusting the spring-seat 36 upon the lower end of the plunger 32 to vary the tension of the helical jaw-expanding springs 38.

It will thus be seen that I have provided an extremely rugged chuck adapted for use in automatic machines and organized so as to be subjected to the minimum of wear and requiring but slight effort for its adjustment.

I claim:

1. In a work-holding chuck the combination with a jaw-carrying head; a plurality of work-gripping jaws mounted in the said head with capacity for radial movement with respect thereto; a mounting-member for the said head; a longitudinally-chambered driving-spindle projecting from said head and rotatably mounted in the said mounting-member; a reciprocating jaw-expanding plunger extending axially through the said head and driving-spindle; a helical spring encircling the said plunger within the chamber of the said driving-spindle and exerting a direct and constant effort to move the same into its jaw-expanding position; and spring means normally urging the said work-gripping jaws into their inwardly-retracting positions.

2. A work-carrying chuck as defined in claim 1 and having a spring-seat adjustably mounted upon the retracting-plunger to vary the tension of the jaw-expanding spring.

3. A work-carrying chuck as defined in claim 1 and having a dust-guard encircling the said driving-spindle and formed with an annular chamber to receive a portion of the mounting-member.

4. In a work-holding chuck, the combination with a jaw-carrying head; a plurality of work-gripping jaws mounted in said head with capacity for radial movement with respect thereto; a mounting-member for the said head; a driving-spindle extending from said head and rotatably mounted in said mounting-member; means for moving the said jaws into their expanded positions; spring means normally urging the said work-gripping jaws into their retracted positions; and an adjustable stop carried by each of the said jaws and engageable with a part of the chuck structure to limit the movement of the said jaws into their retracted positions; whereby the retired positions of the said jaws may be individually regulated to accommodate various forms of work.

5. In a work-holding chuck the combination with a jaw-carrying head; a plurality of work-gripping jaws mounted in the said head with capacity for radial movement with respect thereto; a mounting-member for the said head; a longitudinally-chambered driving-spindle projecting from said head and rotatably mounted in the said mounting-member; a reciprocating jaw-expanding plunger extending axially through the said head and driving-spindle; a helical spring encircling the said plunger within the chamber of the said driving-spindle and exerting a constant effort to move the same into its jaw-expanding position; and an adjustable stop carried by each of the said jaws and engageable with a part of the chuck structure to limit the movement of the said jaws into their retracting positions; whereby the retired positions of the said jaws may be individually regulated to accommodate various forms of work.

6. In a work-holding chuck the combination with a jaw-carrying head; a plurality of work-gripping jaws mounted in the said head with capacity for radial movement with respect thereto; a mounting-member for the said head; a longitudinally-chambered driving-spindle projecting from said head and rotatably mounted in the said mounting-member; a reciprocating jaw-expanding plunger extending axially through the said head and driving-spindle; a helical spring encircling the said plunger within the chamber of the said driving-spindle and exerting a direct and constant effort to move the same into its jaw-expanding position; means for coupling the said plunger to the said head for concurrent rotation therewith; and spring means normally urging the said work-gripping jaws into their inwardly-retracting positions.

7. In a work-holding chuck the combination with a jaw-carrying head; a plurality of work-gripping jaws mounted in the said head with capacity for radial movement with respect thereto; a mounting-member for the said head; a driving-spindle projecting from said head and rotatably mounted in the said mounting-member; a reciprocating jaw-expanding plunger extending axially through the said head and driving-spindle; a spring-seat and a jaw-expanding cam mounted adjustably upon the respective opposite ends of the said plunger; a helical spring encircling the said plunger and bearing against the adjustable spring-seat thereupon to exert a constant effort to move the same and the said jaw-expanding cam into their jaw-expanding positions; and spring means normally urging the said working jaws into their inwardly-retracting positions.

8. In a work-holding chuck the combination with a jaw-carrying head formed in its inner end with an axial bore; a plurality of work-gripping jaws mounted in the said head with capacity for radial movement with respect thereto; a mounting-member for the said head; a driving-spindle rotatably mounted in the said mounting-member and having its outer end entered and secured in the bore in the said head and formed at its inner end with an integral pinion; a reciprocating jaw-expanding plunger extending axially through the said head and driving-spindle; a helical spring encircling the said plunger and exerting a direct and constant effort to move the same into its jaw-expanding position; and spring means normally urging the said work-gripping jaws into their inwardly-retracting positions.

In testimony whereof, I have signed this specification.

CLIFFORD I. PACKER.